United States Patent [19]
Kamatani

[11] Patent Number: 5,629,917
[45] Date of Patent: May 13, 1997

[54] INTEGRATED OPTICAL PICK-UP EMITS LIGHT BEAMS OF SELECTIVE WAVELENGTHS TO AN OPTICAL DISK WITH MULTIPLE DATA LAYERS

[76] Inventor: Yasuo Kamatani, 2-12-2 Yokoyama, Sagamihara-shi, Kanagawa 229, Japan

[21] Appl. No.: 371,787

[22] Filed: Jan. 12, 1995

[51] Int. Cl.[6] ............................................. G11B 7/00
[52] U.S. Cl. .................. 369/112; 369/94; 369/44.37; 369/122; 369/275.1; 369/280; 372/24
[58] Field of Search ........................ 369/94, 112, 121, 369/122, 44.11, 44.12, 44.37, 275.1, 280; 372/45.34, 46, 20, 24

[56] References Cited

U.S. PATENT DOCUMENTS

| | | | |
|---|---|---|---|
| 4,821,277 | 4/1989 | Alphonse et al. | 372/45 |
| 4,918,679 | 4/1990 | Ophelj et al. | 369/112 |
| 5,159,586 | 10/1992 | Yamashita et al. | 369/122 |
| 5,233,595 | 8/1993 | Kawakubo | 369/112 |
| 5,289,454 | 2/1994 | Mohapatra et al. | 369/112 |
| 5,347,526 | 9/1994 | Suzuki et al. | 372/20 |
| 5,361,269 | 11/1994 | Kamatani | 372/24 |
| 5,481,516 | 1/1996 | Kim | 369/44.23 |
| 5,487,060 | 1/1996 | Rosen et al. | 369/94 |
| 5,488,597 | 1/1996 | Chen et al. | 369/94 |

FOREIGN PATENT DOCUMENTS 63-276732  11/1988  Japan .

*Primary Examiner*—Georgia Y. Epps
*Assistant Examiner*—Kim-Kwok Chu

[57] ABSTRACT

An integrated optical pick-up device includes a laser source which emits incoherent laser consist of varied wavelength in wide spectrum, and an optical filter which eliminates improper ranges of the laser's spectrum and transmits only preferred wavelength domains. Therefore, a focus grating which is positioned to intercept the laser can produce several focal points dependent upon selected wavelength by the optical filter. Then another grating deflects each reflected laser from different points on the optical medium at certain angle and transmits to specific photo-detector.

20 Claims, 4 Drawing Sheets

5,629,917

INTEGRATED OPTICAL PICK-UP EMITS LIGHT BEAMS OF SELECTIVE WAVELENGTHS TO AN OPTICAL DISK WITH MULTIPLE DATA LAYERS

BACKGROUND OF THE INVENTION

1. Field of the Invention

This invention relates to optical data storage systems. More specifically, this invention relates to an optical reading and recording apparatus and method for optical data storage systems having multiple data storage surfaces.

2. Description of the Prior Art

Initialized by the vast increase in information that needs to be processed, optical data storage system have become most important system particularly because of their high storage density per area. Most of the recent optical information storage systems rotating single optical disk are used on which the information is digitally stored in concentric circular tracks in an ordered, predifined manner to allow chronological fast reading and fast random access to desired pits of data.

In order to accomplish the even more storage capacity of optical disk systems for the enormous information processing, such as video or picture communication like so called video-on-demand service, multiple disk systems have been proposed. An optical disk system having two or more data layers may in theory be accessed at different disks by changing the focal point with moving lens. Example of this type of state-of-the-art include U.S. Pat. No. 5,202,875 issued Apr. 13, 1993 to Rosen, et al.; Japanese published application, 63-276732 published Nov. 15, 1988 by Watanabe, et al.

The serious problem with these prior art systems is an interference lights reflected on neighboring layers, that causes difficulty to detect the data recorded on certain layer. That cross-talk-signals from the other layers may effect critically to reduce the ability to read the data, especially with several data layers system. In addition, all of the prior art systems requires the moving lens component which is very difficult to control and impossible to fabricate on a single substrate. That has been considered disadvantage on productivity and reliability. An optical reading and recording pick-up device is needed which overcomes these problems mentioned above.

SUMMARY OF THE INVENTION

The present invention has for its object to provide an integrated optical reading and recording pick-up device for multiple data layers system, in which moving mirror is no longer necessary to focus on a certain layer. Another significant object of the invention is to provide a reliable optical pick-up device for multiple data layers system, which can greatly reduce the effect of interference lights reflected on neighboring layers.

The object of the present invention can be achieved by an integrated optical pick-up device for multiple data surface optical disk system, the apparatus comprising: a laser source which emits incoherent light; an optical filter which eliminates improper ranges of the laser's spectrum to cancel the interference noise, and transmits preferred wavelength domains; a grating coupler which is positioned to intercept the laser and focus the laser on the each data surface; an optical data storage medium; a grating which is positioned to intercept the reflected laser to transmits to selective photo-detector; a set of photo-detector array.

For a fuller understanding of the nature and advantages of the present invention reference should be made to the following detailed description taken in conjunction with the accompanying drawings.

DETAILED DESCRIPTION OF THE PREFERRED EMBODIMENT

Embodiments of the present invention will be explained with reference to the drawings.

Figure 1:
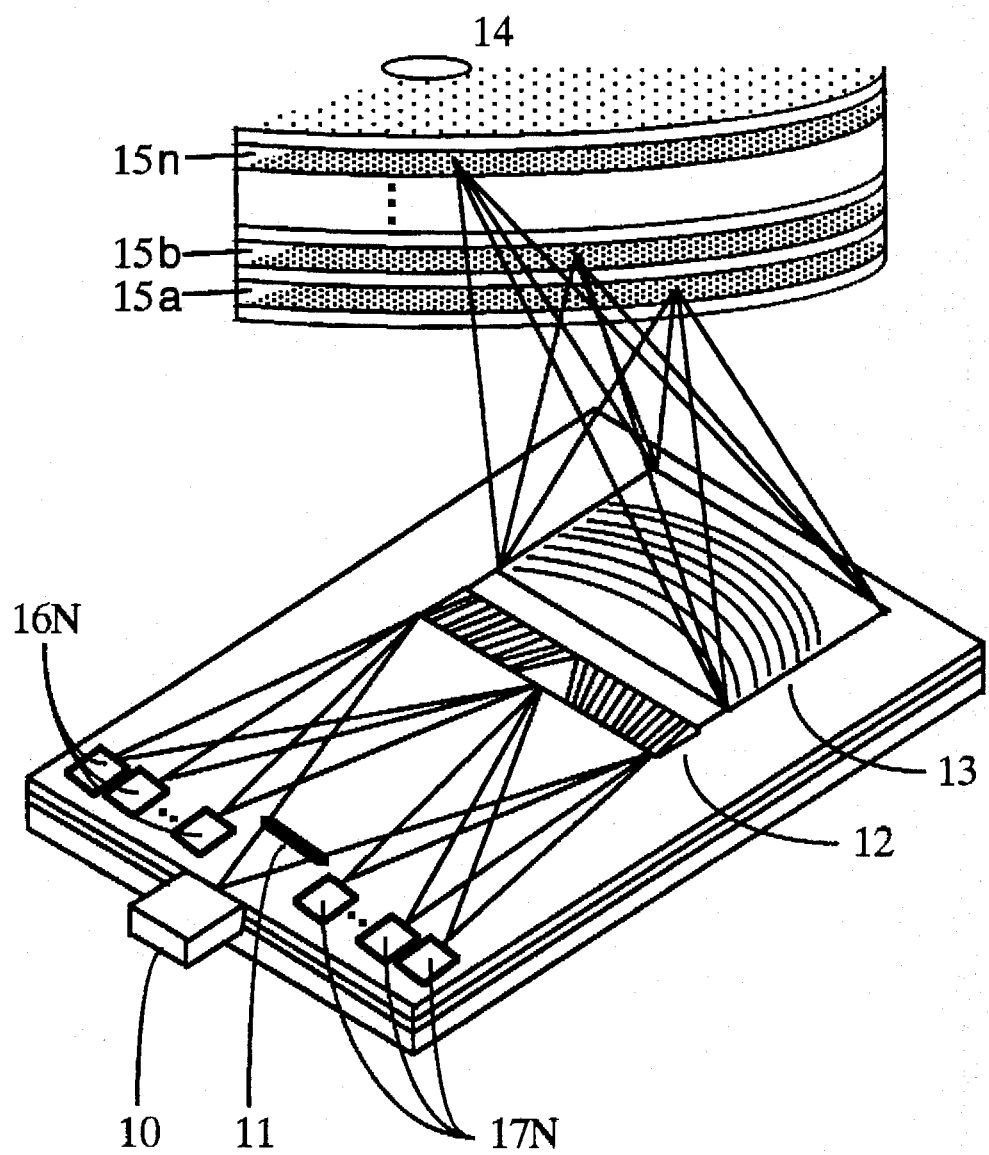
FIG. 1 shows schematic diagram of an integrated optical pick-up device of the present invention.

FIG. 1 shows a schematic diagram of a first preferred embodiment of the integrated optical pick-up device of the present invention. An incoherent laser source 10 emits incoherent light which has wide spectrum. An optical filter 11 located on the laser path to intercept and selectively eliminate improper range of the laser's spectrum to cancel the interference noise. The functional detail of the optical filter 11 is fully explained lately with accompanying FIG. 2. Only the selected domains of the laser spectrum is intercepted by a twin grating beam splitter 12, and the laser beam is focused appropriately in order to enter a focusing grating coupler 13 efficiently. The laser beam is deflected and focused by a focusing grating coupler 13. The focal points are varied for the sake of the optical filter 11 which selectively secure the certain wavelength spectrum. As well-known, a grating can deflect the light beam at certain angle dependent upon wavelength of the light.

Multiple data surface optical disk 14 having a data surface 15a, 15b and 15n is associating with the integrated optical pick-up device. Wherein a, b and n are integer greater than 1. Only three of the data surfaces are explicitly illustrated. Each wavelength spectrum of the laser beam focuses on each data surface 15a, 15b and 15n. Then each reflected laser beam is deflected by a focusing grating coupler 13. Twin grating beam splitter 12 intercepts the laser beam, and deflects each wavelength spectrum of the laser beam for selective distribution into a photo-detector 16N and 17N. Wherein N is an integer greater than 1. Again, it is well-known state-of-the-an that a grating can deflect the light beam at certain angle dependent upon wavelength of the light. Optical signal detected by photo-detector 16N and 17N can be processed by conventional electrical circuits.

Figure 2:
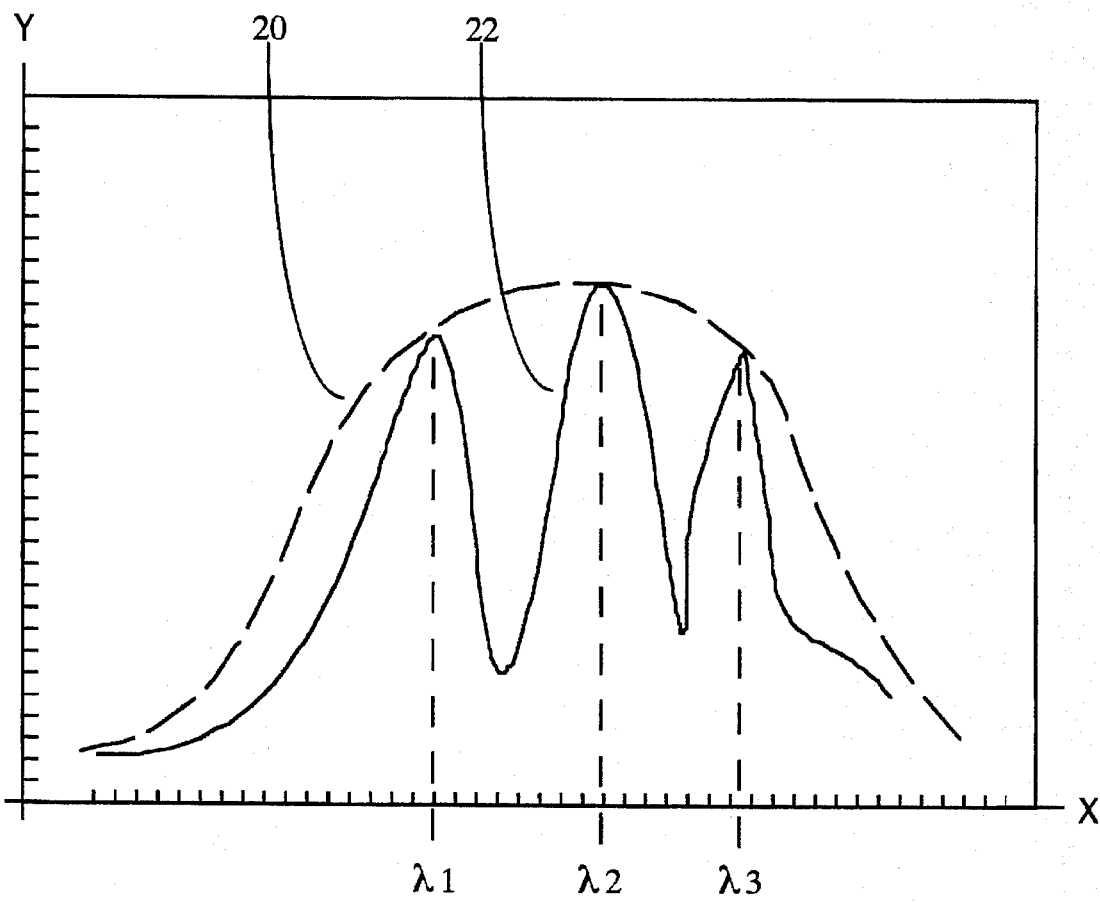
FIG. 2 is a graph of laser intensity versus wavelength of a laser source of the present invention.

FIG. 2 shows a graph of laser intensity versus wavelength of a laser source of the present invention. X axis of the graph denotes wavelength of the laser beam, and Y axis of the graph denotes intensity of the laser. A dotted line 20 shows laser emitting affairs of the incoherent laser source. As mentioned, incoherent laser source emits the light which has wide spectrum, and it is functionally considered that the incoherent laser source emitting varied wavelength of the laser beam. A solid line 22 shows laser beam affairs that some parts of the varied wavelength of the laser beam is selectively eliminated and selectively secured by an optical filter. A graph 22 shows an example of the particular laser beam affair which preferred three parts of the laser beam spectrum λ1, λ2 and λ3 are secured, in order to focus on three layers of multiple data surface optical disk system.

Figure 3:
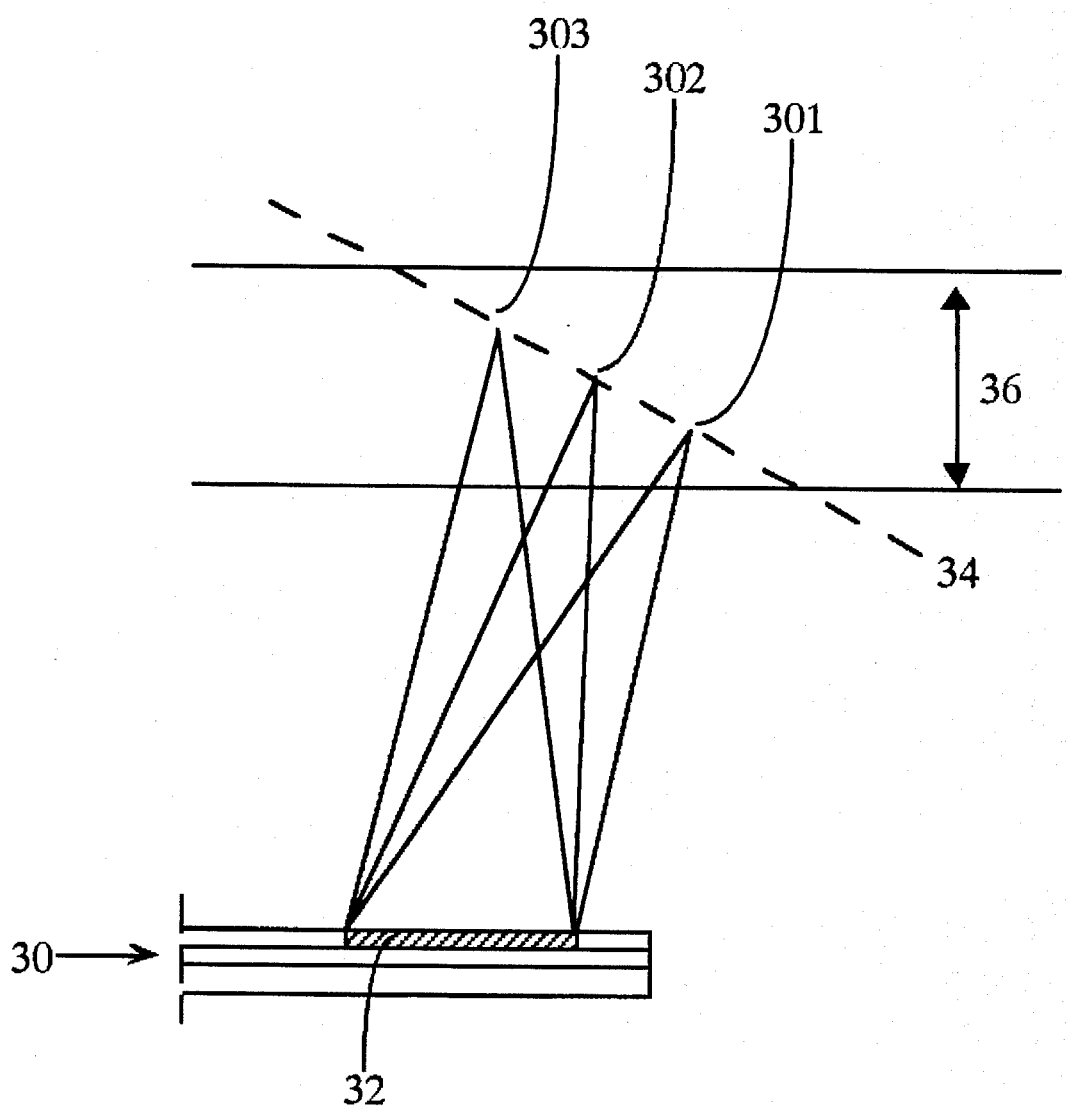
FIG. 3 is a cross-sectional view of an integrated optical pick-up device of the present invention.

FIG. 3 shows a cross-sectional view of an integrated optical pick-up device of the present invention. The laser beam 30 is the particular laser beam that preferred three parts of the laser beam spectrum as λ1, λ2 and λ3 in FIG. 2, are secured in order to focus on three layers. A focusing grating coupler 32 intercepts the laser beam 30. Then the laser beam 30 is deflected, and focused at three certain positions 301, 302 and 303. Each three data layer must be located at these positions between 36. By emitting varied wavelength of the laser spectrum, each laser beam's focal point locates on a dotted line 34 approximately. Each focal point can be controlled by changing the shape of the focusing grating coupler 32, by selecting the different part of the wavelength of the laser spectrum by the optical filter, by mounting a fixed lens or by changing the position of the integrated chip itself, etc.

The apparatus of the present invention comprising an incoherent laser source, gratings and an optical filter to vary the focusing positions, should be compared with the conventional apparatus that scans the laser beam by using a laser source which is tunable to produce different wavelength and a grating, for example U.S. Pat. No. 4,918,679 issued Apr. 17, 1990 to Ophenji, et al. However, in the prior art system, the wavelength is tuned by changing the current supply to the laser source. That must require complicated electrical circuit. In addition, it is quite difficult to tune the wavelength stably with outer electrical circuit.

The incoherent laser source in the apparatus of the present invention does not require any complicated electrical circuits to drive. The incoherent laser source, Super Luminescent Diode (SLD) for example, constantly emits varied wavelength of the spectrum beam. It is much more reliable to select the preferred wavelength spectrum by an optical filter, than tuning the wavelength itself by changing the current supply from the electrical circuit. In addition, incoherent laser beam may hardly interfere one and another, that'll greatly reduce the effect of interference lights reflected on neighboring layers.

Figure 4:
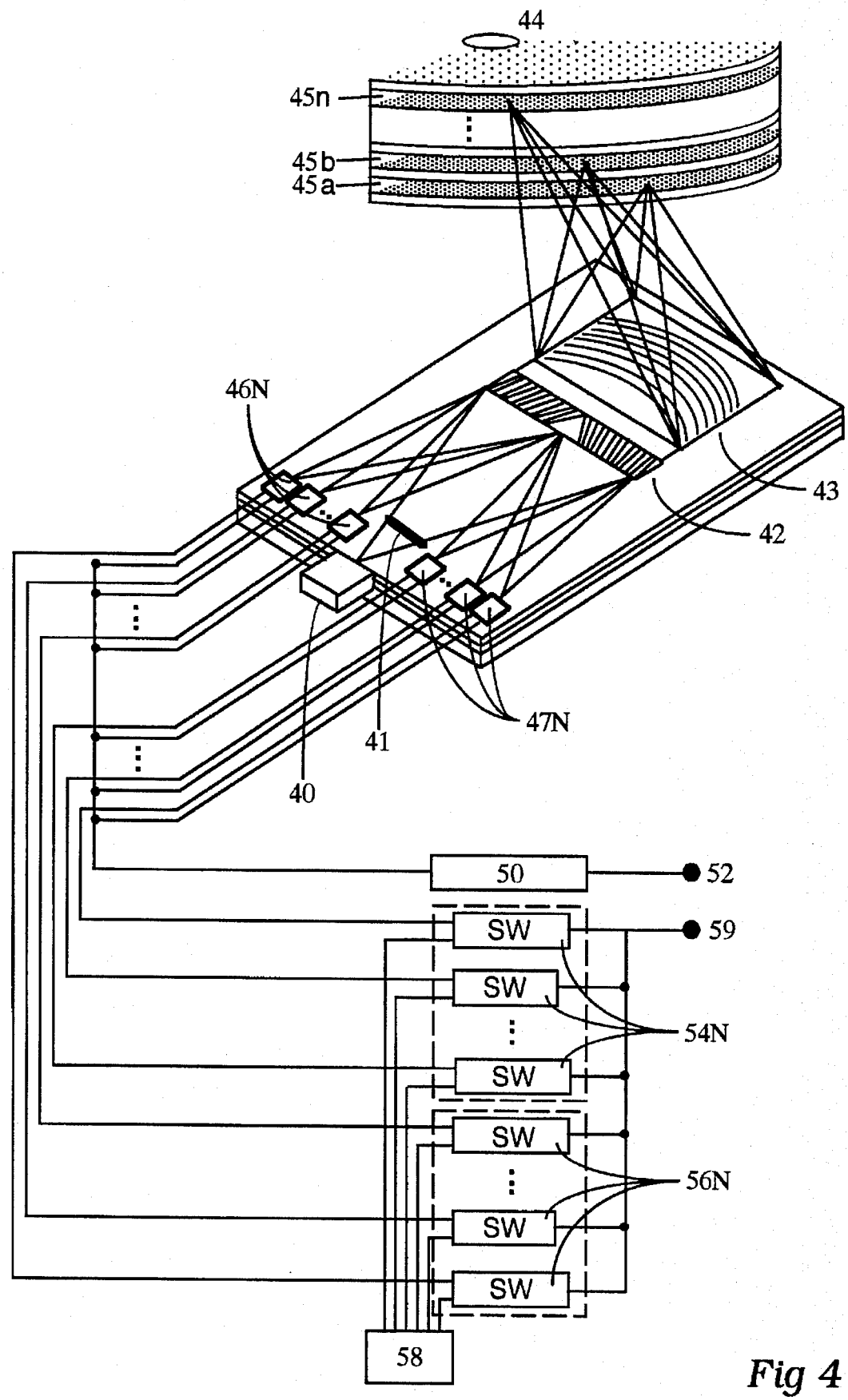
FIG. 4 is a schematic diagram of an integrated optical pick-up device and a signal processing circuit of the present invention.

FIG. 4 shows a schematic diagram of an integrated optical pick-up device and a signal processing circuit for the practical application of the present invention. A Super Luminescent Diode (SLD) 40 emits incoherent light which has wide spectrum. An optical filter 41 located on the laser path to intercept and selectively eliminate improper range of the laser's spectrum to cancel the interference noise. Only the selected domains of the laser spectrum is intercepted by a twin grating beam splitter 42, and the laser beam is focused appropriately in order to enter a focusing grating coupler 43 efficiently. The laser beam is deflected and focused by a focusing grating coupler 43. The focal points are varied for the sake of the optical filter 41 which selectively secure the certain wavelength spectrum.

Multiple data surface optical disk 44 having a data surface 45a, 45b and 45n is associating with the integrated optical pick-up device. Wherein a, b and n are integer greater than 1. Only three of the data surfaces are explicitly illustrated. Each wavelength spectrum of the laser beam focuses on each data surface 45a, 45b and 45n. Then each reflected laser beam is deflected by a focusing grating coupler 43. Twin grating beam splitter 42 intercepts the laser beam, and deflects each wavelength spectrum of the laser beam for selective distribution into a photo-detector 46N and 47N. Wherein N is an integer greater than 1. Optical signal detected by photo-detector 46N and 47N can be processed by conventional electrical circuits.

All photo-detector 46N and 47N supply their photo-current to a single amplifier 50, which outputs an amplified signal 52. Associated with each photo-detector 46N and 47N, a switch array 54N and 56N controlled by a switch control circuit 58, selectively applies a bias voltage 59 to the selected photo-detector 46N and 47N. Each switch is indicated as SW in FIG. 4. The present invention accompanying with this type of multiple-channel optical receiver, is enable to detect the focusing error with high precision.

Although the invention has been particularly shown and described, it is contemplated that various changes and modification may be made without departing from the scope of the invention as set forth in the following claims.

What is claimed is:

1. An integrated optical apparatus comprising:

a substrate;

an optical waveguide formed on a surface of the substrate;

an incoherent laser source which emits incoherent laser beam;

an optical filter positioned to intercept the incoherent laser beam for eliminating selective wavelength parts and securing selective wavelength parts of a spectrum of the incoherent laser beam;

a first grating positioned to intercept the laser beam transmitted from the optical filter for deflecting and focusing each selective wavelength part of the spectrum of the laser beam onto an optical recording medium at selective points dependent upon wavelength of the spectrum;

a second grating positioned to intercept the laser beam reflected from the optical medium for deflecting the each selective wavelength part of the spectrum of the laser beam into at least one selective photo-detector dependent upon wavelength of the spectrum; and a set of photo-detector array positioned to selectively receive the laser beam deflected by and transmitted from the second grating.

2. The apparatus of claim 1, wherein said incoherent laser source is a super luminescent diode.

3. The apparatus of claim 1, wherein said incoherent laser source is a light emitting diode.

4. The apparatus of claim 1, wherein said incoherent laser source is a multi-mode laser diode.

5. The apparatus of claim 1, wherein said first grating is a focusing grating coupler.

6. The apparatus of claim 1, wherein said second grating is a twin grating focusing beam splitter.

7. The apparatus of claim 1, wherein a stable lens is mounted upon said substrate to collimate said laser beam transmitted from a grating.

8. The apparatus of claim 1, wherein said optical filter is an etalon filter.

9. The apparatus of claim 1, wherein said optical filter is an interference filter.

10. The apparatus of claim 1, wherein said optical filter is a neutral-density filter.

11. The apparatus of claim 1, wherein the optical medium is an optical data storage medium having a plurality of data surfaces.

12. The apparatus of claim 11, wherein the laser beam is focused by said first grating onto each data surface of said optical data storage medium, the reflected laser beam from each data surface is deflected by said second grating into a selective photo-detector, and encoded signals on each data surface are reproduced by the specific photo-detector.

13. An integrated optical apparatus comprising:

a substrate;

an optical waveguide formed on a surface of the substrate;

a laser source which is tunable to emit light beams of varied wavelengths;

a first grating positioned to intercept a laser beam supplied from the laser source for deflecting and focusing onto an optical medium at a selective point dependent upon wavelength of the laser beam;

a second grating positioned to intercept the laser beam reflected from the optical medium for deflecting the laser beam into at least one selective photo-detector dependent upon wavelength of the laser beam; and a set of photo-detector array positioned to selectively receive the laser beam deflected by and transmitted from the second grating.

14. The apparatus of claim 13, wherein said first grating is a focusing grating coupler.

15. The apparatus of claim 13, wherein said second grating is a twin grating focusing beam splitter.

16. An integrated optical multi-point focusing apparatus comprising:

a substrate;

an optical waveguide formed on a surface of the substrate;

an incoherent laser source which emits an incoherent laser beam;

an optical filter positioned to intercept the incoherent laser beam for eliminating selective wavelength parts of a spectrum of the in-coherent laser beam and supplying a scanning beam; and a grating positioned to intercept the scanning beam transmitted from the optical filter for deflecting and focusing each selective wavelength part of the spectrum of the scanning beam to various point of an optical recording medium dependent upon the wavelength of the scanning beam and selection of the wavelength of the spectrum by the optical filter.

17. The apparatus of claim 16, wherein said in-coherent laser source is a multi-mode laser diode.

18. The apparatus of claim 16, wherein said grating is a focusing grating coupler.

19. The apparatus of claim 16, wherein a stable lens is mounted on said substrate to collimate said laser beam transmitted from a grating.

20. The apparatus of claim 16, wherein said optical filter is an etalon filter.

* * * * *